United States Patent
Wang

(10) Patent No.: US 8,945,706 B2
(45) Date of Patent: Feb. 3, 2015

(54) POLYMERIC COMPOSITION FOR CELLULOSIC MATERIAL BINDING AND MODIFICATIONS

(76) Inventor: Yin Wang, Bellingham, WA (US)

(*) Notice: Subject to any disclaimer, the term of this patent is extended or adjusted under 35 U.S.C. 154(b) by 1185 days.

(21) Appl. No.: 12/164,062

(22) Filed: Jun. 29, 2008

(65) Prior Publication Data

US 2009/0011214 A1 Jan. 8, 2009

Related U.S. Application Data

(60) Provisional application No. 60/947,649, filed on Jul. 2, 2007.

(51) Int. Cl.
*B32B 3/26* (2006.01)
*B05D 3/02* (2006.01)
*B05D 3/12* (2006.01)
*C08G 63/00* (2006.01)
*B27K 3/15* (2006.01)
*B05D 1/18* (2006.01)
*B05D 3/04* (2006.01)

(52) U.S. Cl.
CPC ... *B27K 3/15* (2013.01); *B05D 1/18* (2013.01); *B05D 3/0493* (2013.01); *B05D 2203/20* (2013.01)
USPC ......... 428/305.5; 427/297; 428/533; 527/300

(58) Field of Classification Search
USPC ...................................... 428/305.5
See application file for complete search history.

(56) References Cited

U.S. PATENT DOCUMENTS

| | | | |
|---|---|---|---|
| 4,147,679 A * | 4/1979 | Scriven et al. | 523/404 |
| 5,162,394 A * | 11/1992 | Trocino et al. | 523/208 |
| 5,770,319 A * | 6/1998 | Franich et al. | 428/528 |
| 5,895,804 A * | 4/1999 | Lee et al. | 525/54.3 |
| 2003/0074741 A1 * | 4/2003 | Sivik et al. | 8/137 |
| 2004/0048541 A1 * | 3/2004 | Offord et al. | 442/364 |
| 2004/0077517 A1 | 4/2004 | Boekh et al. | |
| 2004/0261961 A1 * | 12/2004 | Aitta et al. | 162/76 |
| 2006/0252855 A1 * | 11/2006 | Pisanova et al. | 524/47 |
| 2007/0082187 A1 | 4/2007 | Wang et al. | |

FOREIGN PATENT DOCUMENTS

WO    PCT    1/2009
     US2008/068691

OTHER PUBLICATIONS

Ruffo et al., Moderate to High Dose of Maltodextrin Before Exercise Improves Glycogen Availability in Soleus and Liver After Prolonged Swimming in Rats, Journal of Exercise Physiology, 2009, vol. 12, pp. 30-38.*
Random House Dictionary, Definition of "Oligomer", 2014, Random House Inc., p. 1.*
Wikipedia:About (Retrieved May 16, 2014).*
International Search Report for PCT Application No. US2008/068691 dated Oct. 1, 2008.

* cited by examiner

*Primary Examiner* — Callie Shosho
*Assistant Examiner* — Patrick English
(74) *Attorney, Agent, or Firm* — Tianhua Gu; Global IP Serivces

(57) ABSTRACT

A polymer composition suitable for wood treatment or binding comprises a reaction product of at least a polyol and at least a crosslinking agent. The crosslinking agent has at least 2 carboxylic acid groups per molecule. A wood product comprising a wood substrate and a polymer composition as well as a wood treatment process are also disclosed.

15 Claims, No Drawings

POLYMERIC COMPOSITION FOR CELLULOSIC MATERIAL BINDING AND MODIFICATIONS

CROSS-REFERENCE TO RELATED APPLICATIONS

This application claims the benefit of U.S. Provisional Application No. 60/947,649, filed on Jul. 2, 2007.

TECHNICAL FIELD

The field to which the disclosure generally relates includes wood binding and wood treatments.

BACKGROUND

Polymer compositions have been used to treat wood materials and to adhesively bind wood materials together. U.S. Pat. Nos. 5,770,319 and 5,162,394 disclosed several wood treatment compositions and processes.

Polyester resins are typically synthesized by reacting a monomer containing about 2 hydroxyl groups with another monomer containing about 2 carboxylic acid groups. To yield a high molecular weight resin with practical mechanical strength, the two monomers need to be free of impurities that may cause side reactions, and the molar ratio of hydroxyl group to carboxylic acid group needs to be approximately 1 to 1. Furthermore, the polymerization reaction needs to reach greater than 99% yield to achieve sufficient molecular weight, necessitating removal of even minute amounts of water, a by-product of the reaction. Polyester resins have not been widely used as wood adhesives or as resins to modify wood materials.

SUMMARY OF EXEMPLARY EMBODIMENTS OF THE INVENTION

A polymer composition suitable for wood treatment or binding comprises a reaction product of at least a polyol and at least a crosslinking agent. The crosslinking agent has at least 2 carboxylic acid groups per molecule.

A wood product comprises a wood substrate having voids and a polymer composition comprising a reaction product of at least a polyol and at least a crosslinking agent having at least 2 carboxylic acid groups per molecule. The polymer composition may be disposed substantially inside the voids.

A process of wood treatment comprises: providing a wood substrate having voids; impregnating the wood substrate with a mix composition comprising a polyol and a crosslinking agent having at least two carboxylic acid groups; and causing a chemical reaction between the polyol and the crosslinking agent to form a water insoluble polymer.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

DETAILED DESCRIPTION OF EXEMPLARY EMBODIMENTS

The following description of the embodiment(s) is merely exemplary in nature and is in no way intended to limit the invention, its application, or uses. Unless specifically stated, the process embodiments described herein are not constrained to a particular order or sequence. Additionally, some of the described embodiments or elements thereof can occur or be performed at the same point in time.

There is no limitation on the wood substrate suitable for treatment according to the invention. The term wood substrate herein includes any solid cellulosic materials that comprise fibers of cellulose and/or hemicellulose. The wood substrate may comprise any wood species in any geometric shapes. Suitable wood species may include, but not limited to, soft wood, hard wood (maple, oak, as examples), bamboo, corn stalk, sugar cane bagasse, straw stalks (such as rice straw and wheat straw), seed flax stalk and any hybrid wood materials. Specific examples of wood species may include Radiata Pine, Scots Pine, Red Pine, Yellow Pine, Maple, Alder, Birch, Aspen, Balsawood, and Beech. The wood substrate may be a wood sheet, wood fibers, green lumber, pre-dried lumber, beam, plank, veneer, chip, and wood particles. The wood substrate may be polished, steamed, bleached, or etched before treated according to the invention.

The wood substrate typically includes voids in at least a portion of the substrate. Typical voids are cell voids formed during the formation of the wood as part of a tree. The voids may be interconnected in channels. Soft wood materials tend to include larger size channels, and higher volume fraction of voids. Voids may also be created artificially by any known chemical or mechanical processes, such as etching and incising. The size of the voids may range from nanometers to millimeters in terms of the maximal linear dimension of the void cross-section.

A suitable polyol may include any monomeric, oligomeric and polymeric molecules having at least 2 hydroxyl groups per polyol molecule. Examples of suitable polyols may include, but not limited to, polyvinyl alcohol, polysaccharides, beta-hydroxyl polyacrylates, pentaerythritol, chitosan, oligomers derived from pentaerythritol, and maltodextrin. Beta-hydroxyl polyacrylate includes any polyacrylates having at least 2 β-hydroxyl acrylate monomer units per polymer molecule. The polyol may be further modified to include other chemical groups as long as there are still at least 2 hydroxyl groups per molecule. Therefore, any derivatives of above mentioned polyol examples having at least 2 hydroxyl groups per molecule may be used according to the invention. A polyol having greater than 2 hydroxyl groups per molecule can have greater reactivity toward the crosslinking agent described below. A polyol having, for example, 3 to 1000, 5 to 1000, 10 to 1000, or 20 to 1000 hydroxyl groups per molecule can exhibit high reactivity with the crosslinking agent. Water soluble polysaccharides such as maltodextrin are examples of such a polyol.

Maltodextrin is referred to herein as a polysaccharide derived from α-1.4 linked α-D-glucose. Maltodextrin may be prepared by hydrolysis of a starch. Maltodextrin may have a DE (dextrose equivalent) less than about 20. DE is a measure of reducing power compared to a dextrose standard of 100. The higher the DE, the greater the extent of starch depolymerization with a resulting smaller average molecule size. Maltodextrins having any chain length as well as any stereoisomer configurations may be used. Non-limiting examples of maltodextrin include maltotetraose, maltohexaose, and maltodecaose. Maltodextrin having a dextrose equivalent value in the range of 1 to 25 or 2 to 12 may be used as a polyol material.

A maltodextrin may be used alone or in combination with one or more other maltodextrins or combined with other water-soluble carbohydrates such as starch hydrolysates including other dextrins, modified carbohydrates, and other polymer resins.

The terms "maltodextrin" and "polysaccharide" herein may also include any derivatives of maltodextrins and polysaccharides modified by, for example, acetylation, sulfonation, dehydration, alkoxylation, or any other chemical means as long as there are at least 2 hydroxyl groups per derivative molecule.

The crosslinking agent may include any chemical compounds having at least 2 carboxylic acid groups or 2 groups having reactivity equivalent to carboxylic acid groups per molecule. Carboxylic acid herein includes carboxylic acid, carboxylic anhydride, carboxylic acid methyl or ethyl ester, and carboxylic acid halide groups (including acid fluoride, acid chloride, acid bromide and acid iodide) due to their similar abilities to react with a hydroxyl group to form an ester linkage. The crosslinking agent thus is capable of reacting with the polyol described above to form crosslinking ester linkages, rendering the reaction product insoluble in water. Non-limiting examples of the crosslinking agent include cis, trans-butenedioic acid, ethylene-diamine-tetraacetic acid (EDTA), citric acid, citraconic acid, mesaconic acid, butane-tetracarboxylic acid (BTCA), tartaric acid, fatty acids, succinic acid, itaconic acid, polyacrylic acid and resins having acrylic or methacrylic acid monomer unit.

Optionally, the crosslinking agent may further comprise a vinyl group, represented by the chemical structural unit,

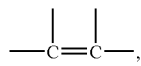

that is capable of undergoing free radical coupling reaction, polymerization, and/or crosslinking reactions. Unsaturated polycarboxylic acids such as maleic acid and unsaturated fatty acid having at least 2 carboxylic acid groups, for example, can react with the hydroxyl groups of maltodextrins to form a polyester. The resulting polyester may be further crosslinked by causing the vinyl groups of the unsaturated acid to couple with each other via heating, oxidation, high energy irradiation or other reaction conditions. A free radical initiator may be included in the mix composition to initiate the crosslinking and/or polymerization reaction of the vinyl groups. Examples of a free radical initiator may include AIBN (2,2'-azobisisotyronitrile), acetyl peroxide, benzyl peroxide, and sodium persulfate. A metal catalyst or oxidizing agent (such as oxygen) may be used to facilitate the reaction of the vinyl group. Organic metal salts of lead, cobalt, zirconium, zinc, calcium, and iron, for examples, can be used to catalyze the oxidative crosslinking of the vinyl group. High energy irradiation may include UV (ultraviolet), electron beam, γ-ray and ultrasonic radiations.

The polyol and the crosslinking agent may be mixed together to form a mix composition. The mix composition may further include water or organic solvents. The polyol and the crosslinking agent may be included in the mix composition such that the molar ratio of the carboxylic acid group in the crosslinking agent to the hydroxyl group in the polyol is at least 1:10. Ratios ranged from 1:10 to 30:1, or 1:5 to 30:1, may be used accordingly. Effective reactions can take place within the above ranges, yielding sufficient amounts of insoluble reaction product for desired treatment effects of the wood substrate. Various combinations of polyols and crosslinking agents can be used to form the mix formulation. A polyol having at least 3, 5, 10, 20, 30, 40, 50, or 60 hydroxyl groups, may be combined with a crosslinking agent having at least 2, 3, 4, or 5 carboxylic acid groups. In one particular example, maltodextrin and citric acid are included in the mix composition. The molar ratio of citric acid to maltodextrin may range from 2:1 to 30:1, or 5:1 to 30:1. In both ranges of those ratios, the corresponding carboxylic acid group to hydroxyl group molar ratio is greater than 1:10. In the mix formulation, the carboxylic acid group of the crosslinking agent can also react with the hydroxyl group of the wood substrate, resulting in covalent attachment to the cellulose fibers of the wood substrate. Such strong covalent bonding to the wood substrate can further enhance the properties (such as hardness, dimension stability, rot resistance . . . etc.) of the treated wood. The mix composition typically has low viscosity, about 20 to 800 centipoises, and it can diffuse or migration readily through the channels and voids in a wood substrate.

In one exemplary process, a wood substrate (such as a solid wood or a wood veneer) having voids is put under reduced pressure (vacuum). The mix composition is subsequently brought in contact with the wood substrate. Due to the reduced pressure, the mix composition tends to drawn into the voids by flow, migration and/or diffusion. The mix composition can be forced to further flow, migrate or diffuse into the voids when an elevated pressure is subsequently applied. Any desired evacuation—pressure schedule including evacuation and/or elevated pressure and/or cycles of evacuation-pressurization, or other impregnation processes known in the art may be used. In one example, the wood substrate is evacuated at more than 60% vacuum, immersed in the mix composition, and subsequently pressurized at a pressure from about 50 psi to 250 psi (about 345 kilopascal to about 1,724 kilopascal). The wood substrate is thus effectively impregnated with the mix composition in this process. The impregnation process may be conducted at room temperature or at elevated temperatures. The mix composition may further include water, especially when the polyol and crosslinking agent chosen are water soluble or water dispersible. Water can facilitate the migration of the mix composition into the interior voids of the wood substrate. An organic solvent may also be used in place of or in addition to water in the mix composition. Examples of organic solvents may include methanol, ethanol, acetone, glycols, glyco-ethers, glyco-esters, and the like. The mix composition may partially fill or completely fill the voids in the wood substrate depending on the particular wood structure and desired level of treatment.

After impregnation into the wood substrate, the polyol and crosslinking agent in the mix composition are caused to react with each other to form a substantially insoluble product. To facilitate such a reaction, the impregnated wood substrate may be subjected to a temperature from ambient temperature to about 150° C. Other temperature ranges such as 40°-105° C., and about 55°-100° C. may also be used to cause an effective reaction between the polyol and the crosslinking agent. The mix composition inside the wood substrate may be allowed to react for minutes up to days depending on the dimension of the wood and the specific polyol/crosslinking agent combination. The wood may also be further dried to a desired moisture level. The crosslinking reaction may be carried out in a conventional or high temperature wood seasoning kiln, or in a hot pressing process of laminating impregnated veneers to another substrate, for example. Hot-pressing may also be used to bind impregnated or treated wood substrates together. The polyol and crosslinking agent react with each other readily under the conditions described above. A wide range of carboxylic acid group to hydroxyl group ratios (1:10 to 30:1) may be used to achieve effective crosslinking reaction to form insoluble polymer products inside the wood voids. In addition, effective level of reactions can be achieved without having to remove excessive amount of water as would be required for a conventional polyester polymerization.

As an illustration, a chemical reaction between a polyol having plurality of hydroxyl groups and a crosslinking agent having 3 carboxylic acid groups per molecule, for an example, is shown in the following chemical reaction scheme. The reaction yields a crosslinked polymer having ester linkages and a by-product water.

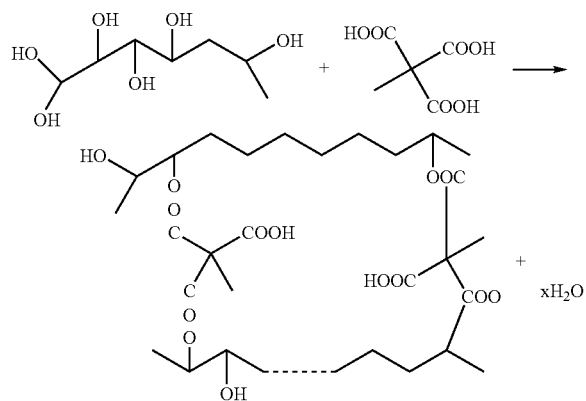

The polyol and/or the crosslinking agent may further include a vinyl group in their chemical structures. Furthermore, a vinyl monomer, oligomer or polymer may be added to the mix composition. After impregnation of the mix composition into a wood substrate, the vinyl group in the mix composition may be caused to react with each other or with other reactive groups in the mix composition to form additional crosslinkages or to further increase the molecular weight of the reaction product. The reaction of vinyl groups may include free radical polymerization, free radical coupling, oxidative coupling, or other addition reactions. The reaction may be initiated or facilitated by heating and/or high energy irradiation. Maleic acid, for example, may be used as a crosslinking agent. The carboxylic acid groups in maleic acid can react with the hydroxyl groups of the polyol to form a crosslinked polyester, while the vinyl group in the maleic acid can undergo a free radical coupling reaction to further crosslink the polyester. Additionally, a vinyl monomer or polymer may be included in the mix composition. The vinyl monomer and/or polymer may copolymerize or co-crosslink with the maleic acid vinyl group.

The mix composition may comprise more than one polyol and more than one crosslinking agent. The mix composition may also include other synergistic components such as polyacrylates and vinyl polymers, especially polyacrylate or vinyl polymers synthesized using acrylic acid or methacrylic acid as a co-monomer. Examples of polyacrylate and vinyl polymers may include copolymers produced from at least two of ethylene, vinyl acetate, vinyl alcohol, vinyl chloride, vinylidene chloride, methyl methacrylate, butyl acrylate, ethyl acrylate, acrylic acid, methacrylic acid, maleic acid, styrene, and the like.

Other synergistic additives that may be included in the mix composition may include preservatives, insecticides, flame retardants, wood colorants, water and UV protectors, nanoparticles and metal compounds. The synergistic components can be readily incorporated into the low viscosity mix composition, and be carried into the voids of wood substrate. After the polyol and crosslinking agent are caused to react and form an insoluble crosslinked product, the synergistic components are substantially fixed into the wood substrate. Coordinating metal compounds, such as organic and inorganic compounds of titanium, tin, zinc, antimony, copper, and zirconium, can also improve the reaction efficiency of the mix composition when incorporated as a synergistic component. Examples of wood preservatives may include commercially available organic and inorganic wood preservative systems, silver, copper and zinc compounds, sorbic acid, boric acid and their salts. Flame retardants may include ammonium phosphate, aluminum oxide, antimony oxide, magnesium oxide, pentaerythritol, nitrogen containing compounds such as melamine, urea, dicyanodiamide, and their derivatives or salts. Various dyes and pigments may be incorporated into the mix composition to provide desirable color to the wood substrate. Water and UV protectors may include any known waxes, silicones, fluorocarbons, UV absorbers, UV inhibitors, free radical scavengers, and antioxidants. Various metal salts, oxides, nanoparticles and hydroxides, when incorporated into the mix composition, are effective in improving the hardness and abrasion resistance of the crosslinked polyester reaction product and the treated wood substrate. Examples of metal salts may include calcium formate, acetate, oxide, hydroxide, carbonate, citrate; magnesium oxide, formate, acetate, citrate; zinc acetate, citrate, zinc oxide, zirconium carbonate, titanium alkoxide, organotin compounds, and the like. The term "nanoparticle" is herein referred to as any particulate materials having a dimension between about 1 nanometer to about 100 nanometers. The nanoparticle may be incorporated into the mix composition as a dispersion or suspension. Due to their small sizes, the nanoparticle can be effectively carried into the voids in the wood substrate by the mix composition in an impregnation process. The nanoparticle thus is intimately embedded into the crosslinked polymer product to provide a reinforcing effect. Nanoparticles and nanoparticle dispersions may include nanoparticles of carbon black, silica, alumina, zirconium oxide, titanium oxide, and antimony oxides.

Any combinations of wood substrate, mix composition comprising any polyol and crosslinking agent, and wood treatment process may be used.

The treatment composition and treated wood products according to this invention may be used in various products such as wood veneer, wood floor, interior and exterior wood furniture, particle boards, plywood and wood laminates.

EXAMPLE 1

5.0 kg butanetetracarboxylic acid, 20.0 kg citric acid and 15.6 kg maltodextrin are mixed in 80.0 kg of water until the solution becomes clear to form a mix composition. A few solid Aspen wood blocks are placed in an autoclave, and evacuated to about 80% vacuum. The mix composition is then transferred into the autoclave. When the autoclave is filled with the mix composition liquid, an elevated pressure is applied to the system for about 3 hours. The impregnated wood blocks are allowed to dry in an oven heated at 100° C. for about 24 hours to allow the mix composition to react to form a crosslinked polymer. The resulting treated wood has a specific density of about 0.6 gram/milliliter comparing to about 0.32 gram/milliliter of the corresponding untreated wood. The treated wood exhibits improved mechanical properties.

EXAMPLE 2

5 kg butanetetracarboxylic acid, 20 kg citric acid, 1 kg itaconic acid, 18 kg maltodextrin, and 5 kg of a 20% by weight aqueous polyvinyl alcohol 5000 solution are mixed with 0.5 kg zinc acetate, 0.4 kg boric acid and 80 kg water to form a mix composition. A few solid radiate pine wood blocks are placed in an autoclave at about 80% vacuum. The mix composition is then transferred into the autoclave. When the autoclave is filled with the mix composition liquid, an elevated pressure is applied to the system for about 3 hours. The impregnated wood blocks are allowed to dry and heated in an oven at about 100° C. for about 24 hours. The resulting treated wood has a specific density of about 0.7 gram/milliliter comparing to about 0.45 gram/milliliter of the corresponding untreated wood. Janka hardness of the treated wood reaches about 1600 pound-force.

The above description of embodiments of the invention is merely exemplary in nature and, thus, variations thereof are not to be regarded as a departure from the spirit and scope of the invention.

What is claimed is:

1. A polymer composition suitable for wood treatment or binding consists essentially of a reaction product of at least a polyol and at least a crosslinking agent and a solvent; said crosslinking agent having at least 2 carboxylic acid groups per molecule and said polyol consists of a maltodextrin or a derivative of maltodextrin which have a dextrose equivalent value between 2 and 12, wherein said crosslinking agent is cis- or trans-butenedioic acid, EDTA (ethylenediamine-tetraacetic acid), citric acid, citraconic acid, butanetetracarboxylic acid (BTCA), tartaric acid, succinic acid, maleic acid, maleic anhydride, mesaconic acid, fatty acids, unsaturated fatty acid, itaconic acid, or any mixtures thereof.

2. A process of wood treatment comprising:
   a. Providing a wood substrate having voids;
   b. Impregnating said wood substrate with the polymer composition as set forth in claim 1 such that at least a portion of said voids are at least partially filled with said mix composition; and
   c. Causing a chemical reaction between said polyol and said crosslinking agent to form a water insoluble polymer.

3. The process as set forth in claim 2, wherein said impregnating comprises exposing said wood substrate to vacuum; contacting said wood substrate with said polymer composition, and subsequently elevating pressure to cause said polymer composition to migrate into said voids.

4. The process as set forth in claim 2, wherein said chemical reaction is effectuated by heating, high energy irradiation, hot pressing, or any combination thereof.

5. The process as set forth in claim 2, wherein said polyol has about 3 to 1000 hydroxyl groups per molecule and said crosslinking agent has at least 3 carboxylic acid groups per molecule.

6. The polymer composition as set forth in claim 1, wherein said crosslinking agent is a mixture of at least two of cis- or trans-butenedioic acid, EDTA, citric acid, citraconic acid, butanetetracarboxylic acid (BTCA), tartaric acid, succinic acid, maleic acid, maleic anhydride, mesaconic acid, fatty acids, unsaturated fatty acid, and itaconic acid.

7. A wood product comprises: a wood substrate having voids and a polymer composition disposed at least partially inside said voids; said polymer composition consisting essentially of a reaction product of at least a polyol comprising maltodextrin having a dextrose equivalent value between 2 and 12 and at least a crosslinking agent having at least 2 carboxylic acid groups per molecule and optionally sorbic acid or boric acid, optionally a metal compound selected from the group consisting of zinc acetate, zinc citrate, calcium formate, calcium acetate, magnesium acetate, magnesium citrate, magnesium formate, and zirconium carbonate, and optionally at least one of ammonium phosphate, aluminum oxide, magnesium oxide, melamine, dicyanodiamide, and urea; wherein said crosslinking agent is cis- or trans-butenedioic acid, EDTA, citric acid, citraconic acid, butanetetracarboxylic acid (BTCA), maleic acid, maleic anhydride, tartaric acid, succinic acid, mesaconic acid, unsaturated fatty acid, itaconic acid or any mixtures thereof; and wherein said wood substrate has been impregnated with said polyol and said crosslinking agent, and said polymer composition is formed from the polyol and the crosslinking agent after the impregnation.

8. The wood product as set forth in claim 7, wherein said wood substrate is one of soft wood, hard wood, Radiata Pine, Scots Pine, Red Pine, Yellow Pine, Maple, Alder, Birch, Aspen, Salsa wood, Beech, corn stalk, bamboo, straw stalks, sugar cane bagasse or any combinations thereof.

9. The wood product as set forth in claim 7, wherein said polymer composition is disposed inside said voids.

10. The wood product as set forth in claim 7, wherein said polymer composition covalently bonds to at least a portion of said wood substrate through a chemical reaction between said crosslinking agent and said wood substrate.

11. The wood product as set forth in claim 7, wherein the molar ratio of the carboxylic acid groups in said crosslinking agent to the hydroxyl groups in said polyol is 1:10 or greater.

12. The wood product as set forth in claim 7, wherein at least one of said polyol and said crosslinking agent comprises a vinyl group that is capable of undergoing a polymerization or a crosslinking reaction in the presence of heat, free radical initiator, oxidizer or high energy irradiation.

13. The wood product as set forth in claim 7, wherein said polyol has between 3 and 1000 hydroxyl groups per molecule or a dextrose equivalent between 2 and 12, and said crosslinking agent has at least 3 carboxylic acid groups per molecule.

14. The wood product as set forth in claim 7, wherein said crosslinking agent is a mixture of a first component and a second component, the first component is at least one of EDTA, citric acid, citraconic acid, butanetetracarboxylic acid (BTCA), tartaric acid, succinic acid, mesaconic acid, and the second component is at least one of cis- or trans-butenedioic acid, maleic acid, maleic anhydride, fatty acids, unsaturated fatty acid, and itaconic acid.

15. The wood product as set forth in claim 7, wherein the crosslinking agent is a mixture of butanetetracarboxylic acid and citric acid.

* * * * *